United States Patent [19]

Griesdorn

[11] Patent Number: 4,839,126
[45] Date of Patent: Jun. 13, 1989

[54] METHOD AND APPARATUS FOR FOLDING THE EDGES OF A SHEET OF MATERIAL

[76] Inventor: Carl P. Griesdorn, 9588 Humphrey Rd., Cincinnati, Ohio 45242

[21] Appl. No.: 206,653

[22] Filed: Jun. 14, 1988

Related U.S. Application Data

[63] Continuation of Ser. No. 95,812, Sep. 14, 1987, abandoned.

[51] Int. Cl.⁴ .............................................. B29C 53/04
[52] U.S. Cl. ................................... 264/339; 156/227; 156/479; 425/398; 425/403; 493/167
[58] Field of Search ........................ 156/216, 227, 479; 264/339; 425/398, 403; 493/167, 408

[56] References Cited

U.S. PATENT DOCUMENTS

| | | |
|---|---|---|
| 1,326,826 | 12/1919 | Anthony . |
| 1,365,648 | 1/1921 | Anthony . |
| 1,811,871 | 6/1931 | Anthony ............................. 156/479 |
| 2,487,494 | 11/1949 | Taber .................................. 264/339 |
| 2,620,854 | 12/1952 | Wetherell . |
| 2,740,458 | 4/1956 | Wold . |
| 2,756,805 | 7/1956 | Silverman . |
| 2,808,099 | 10/1957 | Silverman ......................... 156/479 |
| 3,089,536 | 5/1963 | Bolles ................................ 156/479 |
| 3,147,172 | 9/1964 | Wesa ................................. 156/216 |
| 3,580,770 | 5/1971 | Dyal ................................... 156/216 |
| 3,753,831 | 8/1973 | Copithorne ....................... 156/479 |
| 3,978,191 | 8/1976 | Allen et al. ........................ 264/339 |
| 4,019,944 | 4/1977 | Tomita ............................... 156/479 |
| 4,239,572 | 12/1980 | Tomita ............................... 156/479 |
| 4,347,091 | 8/1982 | Hauck et al. ...................... 156/227 |
| 4,443,398 | 4/1984 | Martinelli et al. ................. 156/227 |
| 4,601,689 | 7/1986 | Finkle et al. ...................... 264/339 |

Primary Examiner—Robert A. Dawson
Attorney, Agent, or Firm—Jeffrey V. Bamber

[57] ABSTRACT

A method and apparatus for simultaneously folding the edges of a sheet of material, particularly the rigid plastic sheets of material having concave sections therein which are used as covers in "blister" packages. It utilizes a die having walls on the sides and a shelf inside the walls, a compressible layer which rests on top of the shelf over which the sheet of material is placed, and a heating plate which presses down on the sheet of material causing the edges of the sheet to become pliable and to bend upward against the walls of the die, and then folding the upright edges over a plate.

6 Claims, 6 Drawing Sheets

METHOD AND APPARATUS FOR FOLDING THE EDGES OF A SHEET OF MATERIAL

This is a continuation of application Ser. No. 095,812 filed 9/14/87 and now abandoned.

BACKGROUND OF THE INVENTION

1. Field of the Invention

The present invention relates generally to a method of, and apparatus for, folding the edges of a sheet of material, and more particularly, is concerned with a method of, and apparatus for, simultaneously folding several edges of pre-formed plastic blisters, such as those commonly used as a cover in the "blister" package form of packaging.

2. Description of the Prior Art

Although the present invention is suited for folding the edges of any type of material which is either flexible or which is rigid and will yield when heat is applied to the material in a localized area, it is particularly suited to folding the edges of the transparent plastic sheets which are used for the covers of blister-type packages on which it is desired to leave a flat unfolded flange portion.

A frequently used type of packaging currently found in retail stores is the transparent blister package. Blister packages are most often used in the case of goods in which it is desirable for the customer to view and, in many cases, examine the article(s) to be purchased outside of the package without destroying the entire package. In the typical blister package, the articles are placed on a flat piece of backing and are then covered with a transparent plastic material.

Numerous types of blister packages are currently in use. In one version of the blister package, the articles are placed on the backing and are sealed to the backing by a heat sealable transparent plastic material. In some cases this type of blister package is desirable because of its unitary sealed character. In other cases, however, it is desirable to provide a package which can be opened without destroying the package itself in order to inspect the articles inside. In these latter cases, a slidable blister package has been used. In the case of a slidable blister package, instead of being sealed to the backing, the plastic sheet is folded on the edges and on the bottom, and the backing slides in between the edges of the plastic sheet and is retained at the bottom.

The present invention is concerned with a method and apparatus for folding the edges of what will be referred to as a "pre-formed blister" which is intended to describe the sheets of plastic used in the slidable version of the blister package on which a concave portion for holding the articles to be displayed has already been formed, but which has not yet been folded at the edges to make it adaptable for receiving the cardboard backing.

Methods and apparatus are available for simultaneously folding the edges of flexible sheets of plastic and other types of flexible materials, provided that the material to be folded does not have any significant contours on its surface. There appears, however, to be a lack of a suitable method and apparatus for simultaneously folding the edges of a material which is rigid, and which has a substantial contour in the surface thereof, such as those materials commonly used to form the cover of a slidable-type blister package.

The means which are used for folding the edges of the transparent pre-formed blister used in the slidable version of the blister package are seen in Allen U.S. Pat. No. 3,978,191 and Taber U.S. Pat. No. 2,487,494. The process and apparatus shown in the Allen patent folds two parallel edges of a sheet-like material by passing the sheet-like material through a series of rollers on each side of the material which are tilted at gradually increasing angles to form the folds on the edges. This process and apparatus suffers the drawback that it is not capable of folding the bottom edge of the plastic sheet simultaneously with the side edges. As a result, the plastic sheet must be removed from the apparatus and passed through a separate machine which folds the bottom. Because a greater number of steps are involved, this has the effect of increasing the cost of making the blister package as well as the time in which each package can be produced.

The Taber method of folding plastic sheet material operates by positioning a piece of plastic over a gap between two fold forming bars, then contacting the plastic sheet with a heated bar in order to bend the same down into the space between the two fold forming bars, and then clamping the sheet together with the movement of the clamping bars. The Taber method suffers the limitation that it is only capable of folding a single edge of a sheet of plastic in one operation.

Other inventions, such as those disclosed in U.S. Pat. Nos. 4,239,572, 4,019,944, 3,147,172, and their cross references, have not been known to have been used to fold the edges of pre-formed blisters used in blister packaging. In addition to being a great deal more complicated than the instant invention, they provide no means for folding the rigid type of plastic used for the covers in blister-type packaging, or for folding plastic articles having any type of contour in their surface and leaving an unfolded flat flange around the contour, or for leaving a space between the folded edge and the unfolded flange needed to receive the cardboard backing in order to form a completed blister package.

Consequently, a need exists for a process and apparatus for simultaneously folding the edges of a pre-formed plastic blister which is simple to manufacture and use, and which adequately overcomes the deficiencies of the prior attempts to satisfy this need.

SUMMARY OF THE INVENTION

With the above background in mind, it is an object of the present invention to provide a process and apparatus for folding the edges of a sheet of material, particularly the rigid pre-formed plastic blisters used in blister packaging, which overcomes the above-mentioned drawbacks of the known prior art processes and devices used for this purpose.

This, as well as other objects which will become apparent as the description proceeds, are fulfilled by the provision of the inventive method and apparatus for folding the edges of a sheet of material which includes a die; a compressible layer which rests on top of the die, over which the sheet of material is placed; a means for applying heat and force to the sheet of material from above to make the sheet of material pliable at the margins along the edges thereof and to compress the compressible layer and erect the edges of the sheet of material; and, a means for folding the edges of the sheet of material on top of the unfolded portion of the sheet of material.

In its preferred form, the die has a shelf around the interior of its walls; the means for applying force to the sheet of material is a member which has dimensions less than those between the walls of the die so that the force applied to the sheet of material will cause the edges of the sheet of material to be bent upward against the walls of the die; and, the means for folding the edges of the sheet of material comprises a plurality of horizontally movable bars.

In addition, a template can be placed upon the compressible layer and underneath the sheet of material to uniformly support the unfolded portion of the sheet of material when the member presses down on the sheet of material and causes the compressible layer to compress. Also, in its preferred form, the means for folding the edges of the sheet of material further comprises a folding plate which is pressed down upon the unfolded portion of the sheet of material before the edges of the sheet of material are folded over by the horizontally movable bars so a space is formed between the edges of the sheet of material and the unfolded portion of the sheet of material after the edges have been folded.

Additional mechanisms can be provided in the preferred embodiment of this invention, including: a cutter which cuts off the corners of the sheet of material to be folded so the edges of the folded sheet will not overlap at the corners after they have been folded; and, a means for ejecting the finished folded sheet of material from the die.

Another object of the invention is to provide a method for folding the edges of a sheet of material comprising the steps of: providing a die which has a shelf around the interior of its walls and a compressible layer which rests on top of the shelf inside the die; placing a sheet of material on top of the compressible layer; lowering a member, which can be heated, of dimensions less than those between the walls of the die down upon the sheet of material to heat fold lines along the edges of the material and to compress the compressible layer to bend the edges of the material upward against the walls of the die; placing a plate on top of the unfolded portion of the sheet of material; and, bending the edges of the sheet of material over the plate.

Other objects of the invention and its mode of operation will become apparent upon consideration of the following description and accompanying drawings.

Detailed Description of the Invention

Figure 1:
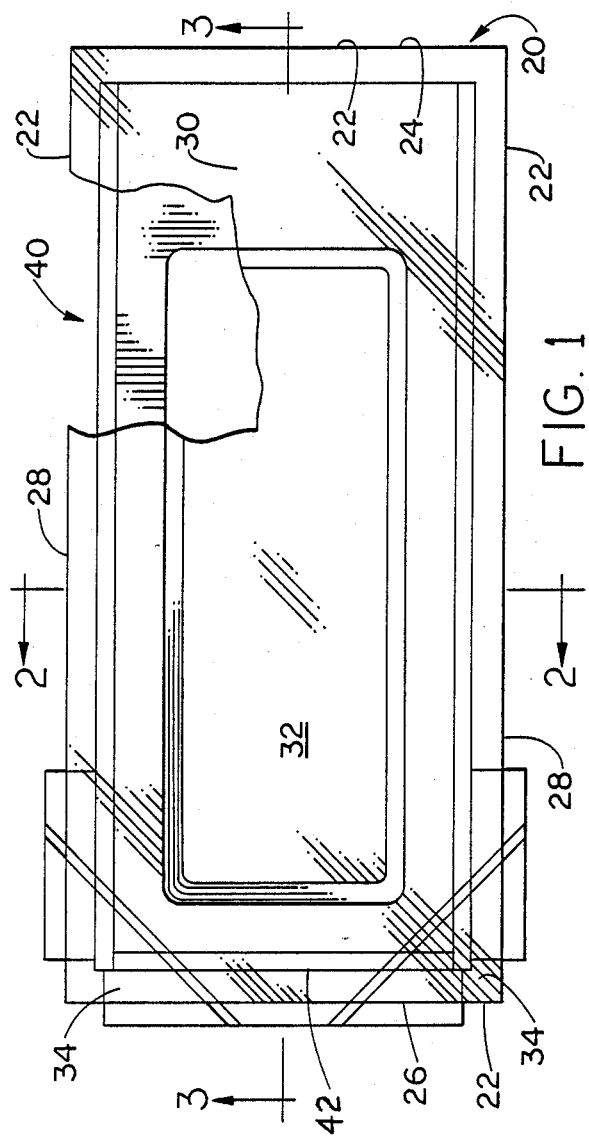
FIG. 1 is a top view of a partially cut away pre-formed blister shown in place on top of the template and die of the present invention.

Referring now to the drawings, the figures illustrate the steps in the operation of the apparatus used to carry out the method of the present invention in the order in which they occur. The entire operation of the apparatus is not capable of being illustrated in a single figure, therefore, it will be necessary to refer to more than one figure to follow the operation of the invention.

Figure 3:
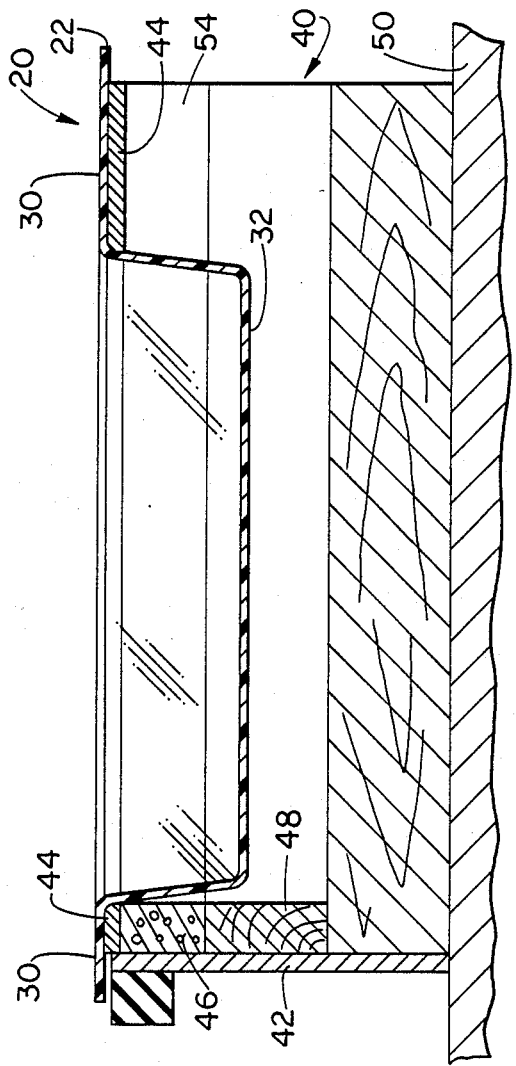
FIG. 3 is a sectional view of the pre-formed blister in the die taken along lines 3—3 of FIG. 1.
Figure 2:
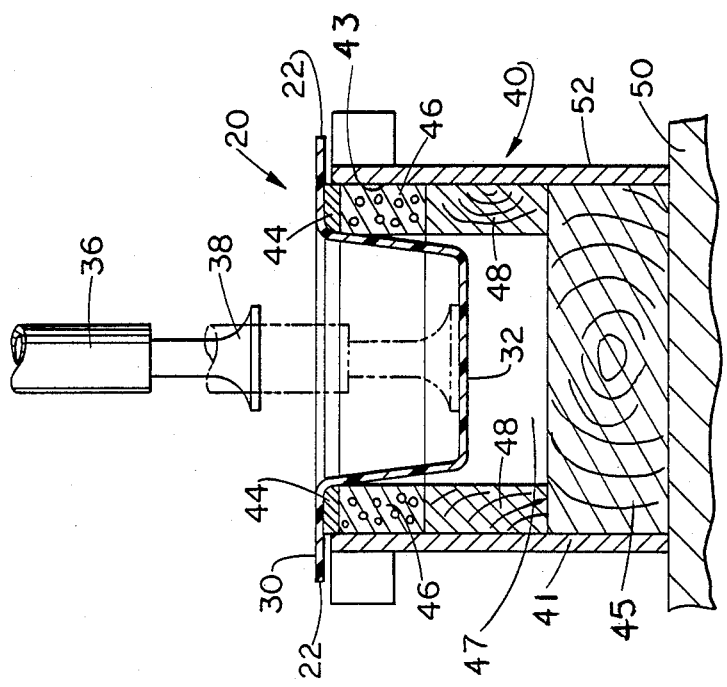
FIG. 2 is a sectional view taken along lines 2—2 of FIG. 1 which shows the placement of the pre-formed blister in the die of the present invention by a plunger having a vacuum cup on its end.
Figure 4:
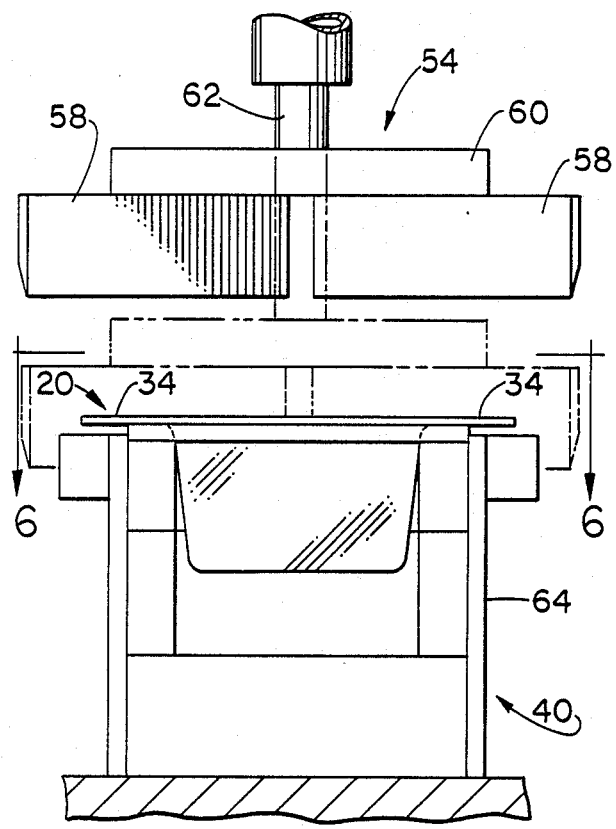
FIG. 4 is a side elevational view of the die of the present invention, as seen from what will be designated as the bottom end, showing the downward movement of the blades of the cutter of the instant invention.
Figure 5:
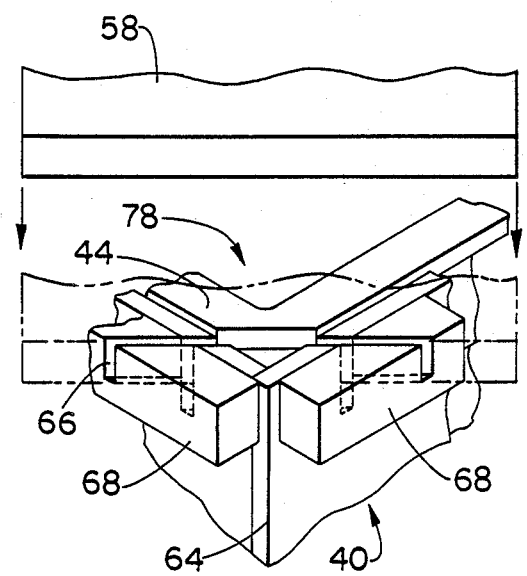
FIG. 5 is a perspective view of one of the corners of the die of the present invention, showing the recess at the corner which the cutting blade enters after travelling through the cutting stroke, and the cutting blade in diagrammatic form being lowered to cut off one of the corners of the pre-formed blister.
Figure 6:
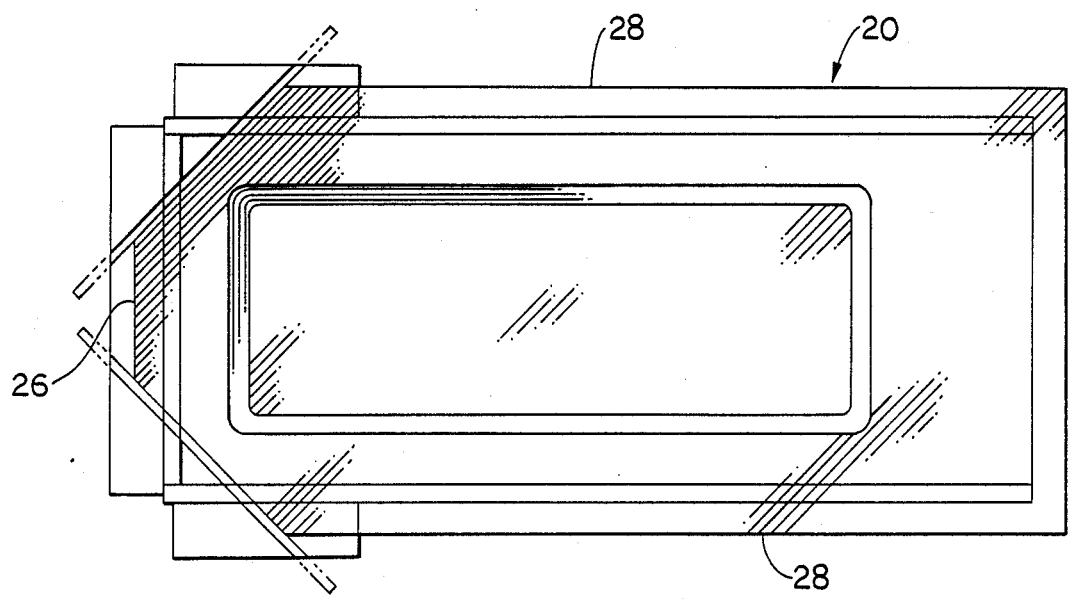
FIG. 6 is a top view taken along lines 6—6 of FIG. 4, showing the pre-formed blister after the edges of the same have been cut off by the cutting blade.
Figure 7:
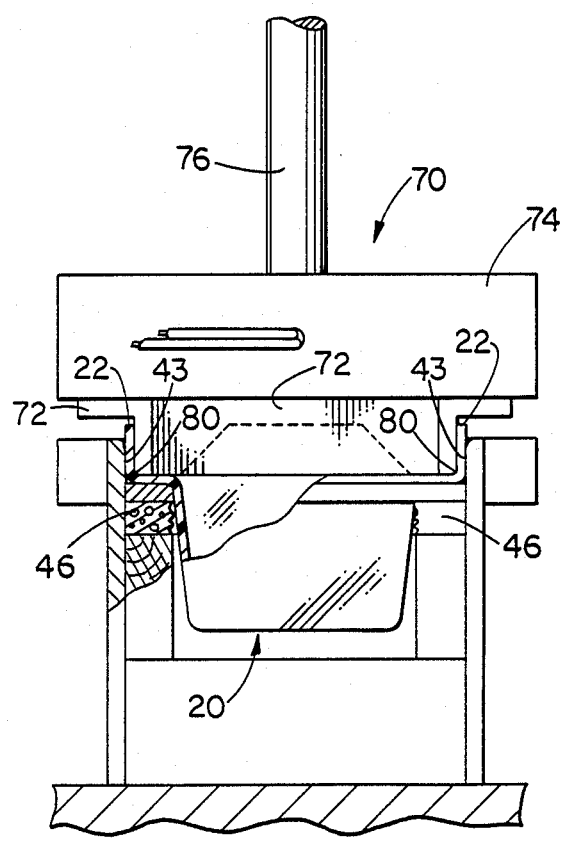
FIG. 7 is a side elevational view of what will be referred to as the top end of the die of the present invention, partially cut away, showing the means for applying heat and force to the sheet of material from above to compress the compressible layer and to erect the edges of the sheet of material.
Figure 8:
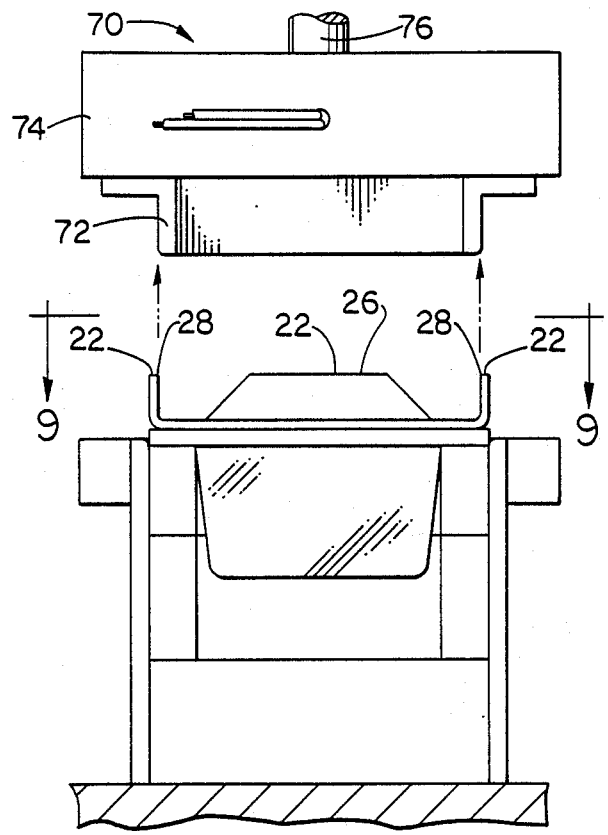
FIG. 8 is a side elevational view of the top end of the die of the present invention and the upright edges of the sheet of material, after the means for applying heat and force to the sheet of material has completed its operation and is being withdrawn from the partially folded preformed blister.
Figure 9:
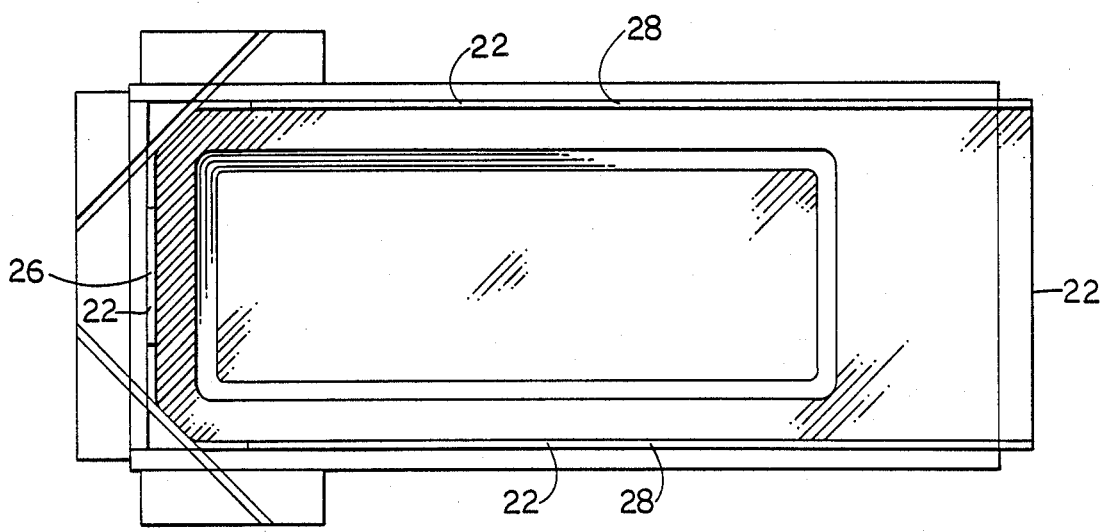
FIG. 9 is a top view taken along line 9—9 of FIG. 8, showing the upright edges of the partially folded pre-formed blister.
Figure 14:
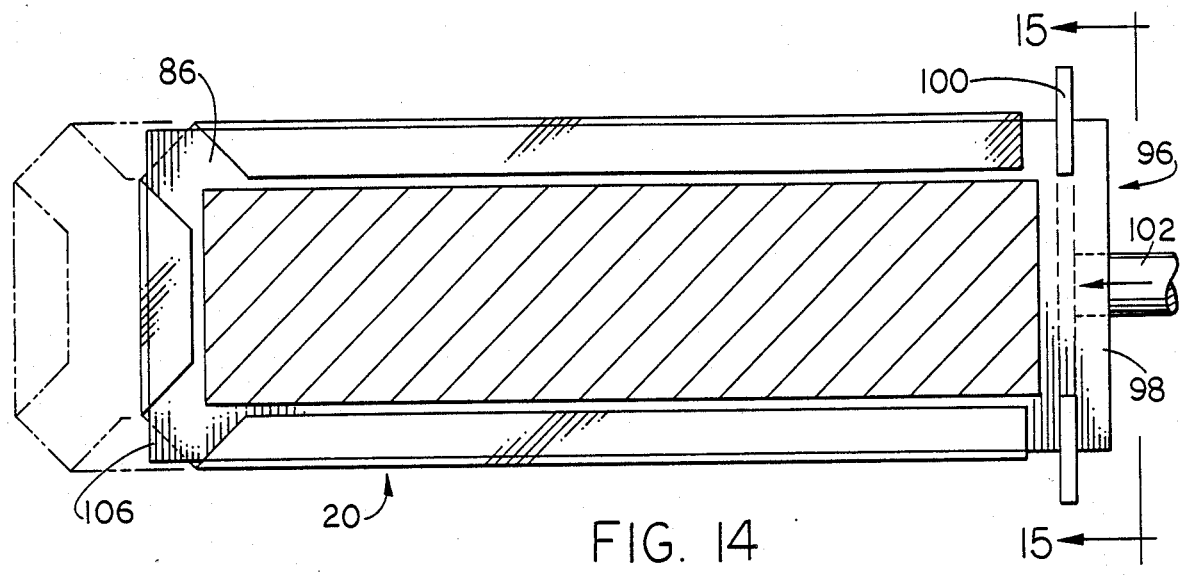
FIG. 14 is a sectional view taken along lines 14—14 of FIG. 13 of the ejector means the present invention; and, FIG. 15 is a side elevational view taken along lines 15—15 of FIG. 14, showing the end of the ejector means of the present invention.
Figure 15:
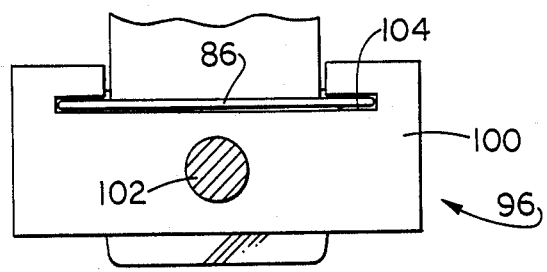

In the preferred embodiment of the invention, FIGS. 1 through 3 show the placement of a sheet of material, herein the form of a pre-formed blister 20, in the die 40 of the instant invention. As shown in FIGS. 4 through 6, the pre-formed blister 20 remains in a stationary position in the die 40 when the cutter 54 cuts off two of the corners 34 of the pre-formed blister 20. Next, FIGS. 7 through 9 illustrate the operation of the means for applying heat and force to the sheet of material from above 70, to compress the compressible layer 46 and erect the edges 22 of the pre-formed blister 20. FIGS. 8 and 9 show the upright edges 22 of the partially folded pre-formed blister 20. FIGS. 10 through 13 depict the means for folding the edges of the sheet of material 82 on top of the unfolded portion of the sheet of material, here shown as the flanges 30 of the pre-formed blister 20, and FIGS. 14 and 15 illustrate the ejector means 96 of the instant invention.

Before describing the operation shown in the figures in detail, a brief explanation will be given of the terminology which will henceforth be used to describe the various characteristics or features of the materials which are used to produce a finished blister package.

The starting materials used to form a blister package are the backing and the plastic sheet which eventually forms the blister portion of the package. The backing used to form both the sealed type of blister package and the slidable blister package is generally simply a piece of cardboard cut to the desired shape. The formation of the backing is a simple process and is not the subject of this invention.

For the purpose of this invention, the starting material or workpiece for completing the formation of the blister cover is a pre-formed transparent plastic blister. This is essentially a flat piece of clear plastic which is rigid, but will yield when heated which has been deformed in the center by heating or otherwise to form a concave portion of the desired shape. The concave portion is eventually used to hold the articles to be displayed within the blister package. The concave portion is frequently rectangular in cross section both in width and length, but can be of any shape and usually is varied in size and shape to suit the size of the article or articles to be displayed.

Pre-formed blisters such as those described above can either be made, or purchased commercially. In either case the flanges around the concave portion or the sides of the pre-formed blister covers are straight, and must be bent on the edges and bottom 180° in the direction opposite the projection of the concave portion to receive the backing.

Referring again to the drawings, FIG. 1 shows such a pre-formed blister generally designated 20 which has been placed in the die 40 of the instant invention. The pre-formed blister 20 is shown in FIGS. 1 through 3 before any steps have been taken to fold its edges 22 using the apparatus of the present invention in order to make the edges 22 acceptable for receiving the cardboard backing.

As seen in FIG. 1, the pre-formed blister 20 depicted in the drawings has four edges which have been generally designated 22, and which include a top edge 24 and opposite the top edge 24, a bottom edge 26, and two opposing side edges 28. The bottom edge 26, has been designated as such because it will be at the bottom of the blister package when the finished package has been assembled and is hanging on display.

Flanges 30 lie around the entire perimeter of the pre-formed blister 20 between the edges 22 and the concave portion 32 in the center of the pre-formed blister 20. The shape of the concave portion 32 of the pre-formed blister 20 is best seen in FIGS. 2 and 3. These figures also show that the flanges 30 of the pre-formed blister 20 remain in the flat configuration of the sheet of material from which the pre-formed blister 20 was made. The width of the flange 30 along the top edge 24 of the preformed blister 20 is greater than that along the bottom edge 26 because the portion of the flange 30 along the top edge 24 of the pre-formed blister 20 generally serves the function of covering the backing in the assembled blister package and space is often reserved on the backing under this section of the flange 30 to place advertisements and product information. In this embodiment of the invention, only the side edges 28 and the bottom edge 26 of the pre-formed blister 20 are to be folded to receive the backing, although it is contemplated that the top edge 24 of the pre-formed blister 20, could be folded simultaneously as well, but this is generally not necessarry for the formation of a slidable-type blister package.

The pre-formed blister 20 may be fed into the method and apparatus for folding the edges of a sheet of material by a variety of different mechanisms. The mechanism used in this embodiment of the invention includes a rack (not shown) which is adjustable in its dimensions to accommodate different sizes of pre-formed blisters. As seen in FIG. 2, a rotating plunger 36 with a vacuum cup 38 on its end contacts and adheres to the pre-formed blisters in the rack (not shown), and pulls them out of the rack and then rotates until the pre-formed blister 20 is over the die 40 of the instant invention, and then the vacuum pressure is released to place the pre-formed blister 20 in the die 40.

In FIG. 2, the rotating plunger 36 is depicted in dashed lines in its lowest position above the die 40. The rotating plunger 36 is depicted in solid lines in position above the die 40 following the release of the vacuum pressure and the placement of the pre-formed blister 20 in the die 40. The rotating plunger 36 will then move from that position over the die 40 out of the way and will rotate to obtain another pre-formed blister 20 to start another cycle of the operation of the apparatus.

FIGS. 1 through 3 depict the die 40 essentially as a rectangular-shaped box having walls 41 made of metal plates, and a wooden bottom 45. It is contemplated, however, that the die 40 can be made of any suitable material or materials and can be of any shape. The shape and dimensions of the die 40 can be varied to accomodate different sizes and shapes of pre-formed blisters. The die 40 has a hollow section 47 in the center to receive the concave portion 32 of the pre-formed blister 20. If the sheet of material to be folded is flat, however, it is clear that no such hollow section is necessary. In addition, as illustrated in FIG. 2, the edges 22 of the pre-formed blister 20 extend outside the inside of the walls 43 of the die 40. Also as illustrated in FIG. 2, the portion of the flanges 30 which are not to be folded should remain inside the inside of the walls 43 of the die 40.

In FIG. 1 the end of the die 40 which lies under the bottom edge 26 of the pre-formed blister 20 has been designated as the bottom end of the die 42. A cross section as seen looking toward the bottom end of the die 42 is shown in FIG. 2. As seen in FIG. 2, the pre-formed blister 20 rides on top of template 44 shown as rectangular in shape in these figures with a rectangular opening in the center so that the concave portion 32 of the pre-formed blister 20 can extend into the hollow section 47 die 40. Underneath the template 44 is a compressible layer 46, which in this embodiment of the invention extends around three sides of the interior walls 43 of the die 40. The compressible layer 46 is made of rubber or similar material, and could be made of any suitable material which yields under the application of force, and could even be composed of a series of springs. The compressible layer 46 functions principally in the latter steps of this method and apparatus to yield so the side edges 28 and the bottom edge 26 of the pre-formed blister 20 can be turned up during the folding stages of the invention. The shape of the compressible layer 46 generally conforms to the shape of the shelf 48 which will hereinafter be described and is also open in the center to receive the concave portion 32 of the pre-formed blister 20.

The compressible layer 46 rests on top of a shelf 48 which serves to support the compressible layer 46 in order to restrain, within certain boundaries, the distance which the compressible layer 46, the template 44, and the flanges 30 of the pre-formed blister 20 move. The shelf 48 around the interior walls of the die is approximately the same width as the flanges 30 around the perimeter of the pre-formed blister 20. When force is applied on top of the pre-formed blister 20, the shelf 48 permits the compressible layer 46 to compress which will cause the edges 22 of the pre-formed blister 20 to bend upward and as a result of its width, will allow the concave portion 32 of the pre-formed blister 20 to extend into the hollow section 47 of the die 40, but will not permit the remaining portion of the flanges 30 to bend. The shelf 48 is shown in this embodiment of the invention as being made of blocks of wood, but it can be made of any suitable material. Wood was used because it was relatively simple and inexpensive to form blocks of the desired shape into the shelf 48, and these blocks of wood could be easily replaced with blocks of different sizes and shapes to accommodate a different sized pre-formed blister 20. The entire die 40 rests on table 50.

FIGS. 4 through 6 illustrate the operation of the cutter 54 of the instant method and apparatus for folding the edges of a sheet of material. The cutter 54 serves to cut off the corners 34 made by the bottom edge 26 and side edges 28 of the pre-formed blister 20 so these edges can be folded back over the flanges 30 without overlapping each other at the corners 34.

Mention should be made of the fact that in the operation of the cutter 54, and in the remaining operations performed by the instant invention, the steps of the invention are shown as taking place at different stations in which work is performed on a pre-formed blister 20 when it is at rest in a die 40. In the preferred embodiment of the invention the pre-formed blister 20 remains in the same die during all of these steps, while the die 40 travels on a table 50 from one workstation to the next.

Although it is within the scope of this invention to have the die 40 remain stationary under each respective workstation and to remove the pre-formed blister 20, and place it in a different die 40 under each workstation, or even to have the workstations themselves move, it is considerably more efficient and less expensive to simply have the pre-formed blister 20 remain in one die 40, and to either mount several identical dies 40 on a rotating turntable or on a conveyor which travels underneath the workstations so different steps in the process of folding the edges of a sheet of material can be performed on several pre-formed blisters at the same time.

In FIG. 4, an end view of the die 40, similar to the depicted in the cross section in FIG. 2 as seen from the opposite direction, is shown. The cutter 54 is composed of a pair of cutting blades 58 mounted on a cutter plate 60 for stability, which in turn is affixed to a rod 62 which moves the plate 60 and its attached blades 58 downward as shown in dashed lines in FIG. 4, to cut off two of the corners 34 of the pre-formed blister 20.

A perspective view of one of the corners 64 of the die 40, is shown in FIG. 5 to illustrate the movement of one of the cutting blades 58 into the groove 66 at the corner 64 of the die 40. Rubber blocks 68 through which the groove 66 also passes are attached at the corners 64 of the die 40 in this embodiment of the invention to provide a surface upon which the corners 34 of the pre-formed blister 20 can be retained when the cutting blades 58 descend downward to cut off the corners 34. In the embodiment of the invention shown in the drawings, because the walls 41 were not of sufficient thickness, it was necessary to affix the rubber blocks 68 to the walls 41 at the corners 64 of the die so the corners 34 of the pre-formed blister would not yield under the force applied by the cutter 54 which would prevent the corners 34 from being cut off completely.

In FIG. 6, a top view of the pre-formed blister 20, with two of its corners 34 removed is seen. The corners 34 of the pre-formed blister 20 have been cut off along diagonal lines, and now the pre-formed blister 20 is in suitable condition for folding the side edges 28 and the bottom edge 26 in order to allow the pre-formed blister to receive the cardboard backing.

FIGS. 7 through 9 illustrate the operation of the means for applying heat and force to the sheet of material from above 70, which can be referred to simply as the means for applying heat and force. The means for applying heat and force 70 comprises a member, such as heating plate 72, a bearing plate 74, and a shaft 76. In this step of the operation, in the preferred embodiment of this invention, lines at the margin of material along the side edges 28 and bottom edge 26 of the pre-formed blister 20 are heated which causes these edges 26 and 28 to become pliable to enable them to be bent upward. FIGS. 7 and 8 show the movement of the means for applying heat and force to the sheet of material from above 70, and FIG. 9 shows a pre-formed blister 20 in the finished state which it leaves the means for applying heat and force to the sheet of material from above 70.

As shown in FIG. 7, the means for applying heat and force to the sheet of material from above 70, can be a member such as a heating plate 72 which is pressed down by the shaft 76 upon the pre-formed blister 20 which came from the cutter 54. In the case of the embodiment of the invention shown in the drawings the heating plate 72 is attached to a bearing plate 74 which in turn is affixed to the shaft 76.

The heating plate 72 is of a shape which conforms to the space between the walls 41 of the die 40, but is slightly less in its dimension than the dimensions between the walls 41 of the die 40. This allows room for the edges 22 of the pre-formed blister 20 to fit in between the interior walls 43 of the die 40 and the edges of the heating plate 72 when the heating plate 72 is moved downward by the shaft 76 to compress the compressible layer 46.

The bearing plate 74 is simply a flat piece of metal capable of conducting heat which is connected to an electrical current and is heated to a temperature slightly above the yield temperature of the sheet of material. The bearing plate 74 in turn heats the heating plate 72 by conduction. It is also contemplated that bearing plate 74 may be omitted entirely from the means for applying heat and force to the sheet of material from above 70, and the source of heat may be supplied directly to the heating plate 72, which in its preferred embodiment, may be a series of vertical plates positioned directly above the margins along the edges of the material, such as the fold lines 80 of the pre-formed blister 20 to limit the area of the flanges 30 to which heat is applied to the fold lines 80.

When the heating plate 72 first contacts the fold lines 80 inside of the edges 22 of the pre-formed blister 20, heat is transferred to the plastic at the fold lines 80 which causes the plastic at the fold lines 80 to become pliable. As the heating plate 72 moves downward, it pushes down on the fold lines 80 of the pre-formed blister 20 compressing the compressible layer 46 and turning the edges 22 of the pre-formed blister 20 upward. The heating plate 72 need only be brought in contact with the pre-formed blister 20 for a short period of time, which has been found to be approximately one-half second in most cases. The length of time which the heating plate must be brought in contact with the fold lines 80 varies with the thickness of the sheet of material, the temperature which is applied to the pre-formed blister 20, as well as with the type of material from which the pre-formed blister 20 is made. Some of the heat which is applied to the bearing plate, or if there is no bearing plate, to the heating plate alone, will be lost through the surfaces of these plates before they come in contact with the fold lines 80 and the temperature which will actually be applied will be in the range of the yield temperature of the material of the pre-formed blister 20. For pre-formed blisters made of polyvinyl chloride, it is estimated that the temperatures needed at the fold lines 80 is between 80° and 90° C. In practice, since the edges 22 of the pre-formed blister 20 are generally exposed while the pre-formed blister 20 is in the die 40, it is a relatively simple matter to examine the degree to which the edges 22 have been bent and to adjust the temperature accordingly. Since the end of the plastic edges 22 have not been heated themselves, they are therefore of sufficient stiffness to remain in an upright position after the heating plate 72 is removed.

FIG. 9 shows the configuration of the pre-formed blister 20 after it leaves the means for applying heat and force to the sheet of material from above 70. With respect to the description of the means for applying heat to the sheet of material 70, which has been set forth in detail above, it is contemplated that the heating and application of the force can take place in separate operations as well. After the heating operation is performed on the pre-formed blister 20, the die 40 travels under the means for folding the edges of the sheet of material 82 where the operations depicted in FIGS. 10 through 13 are performed.

Figure 10:
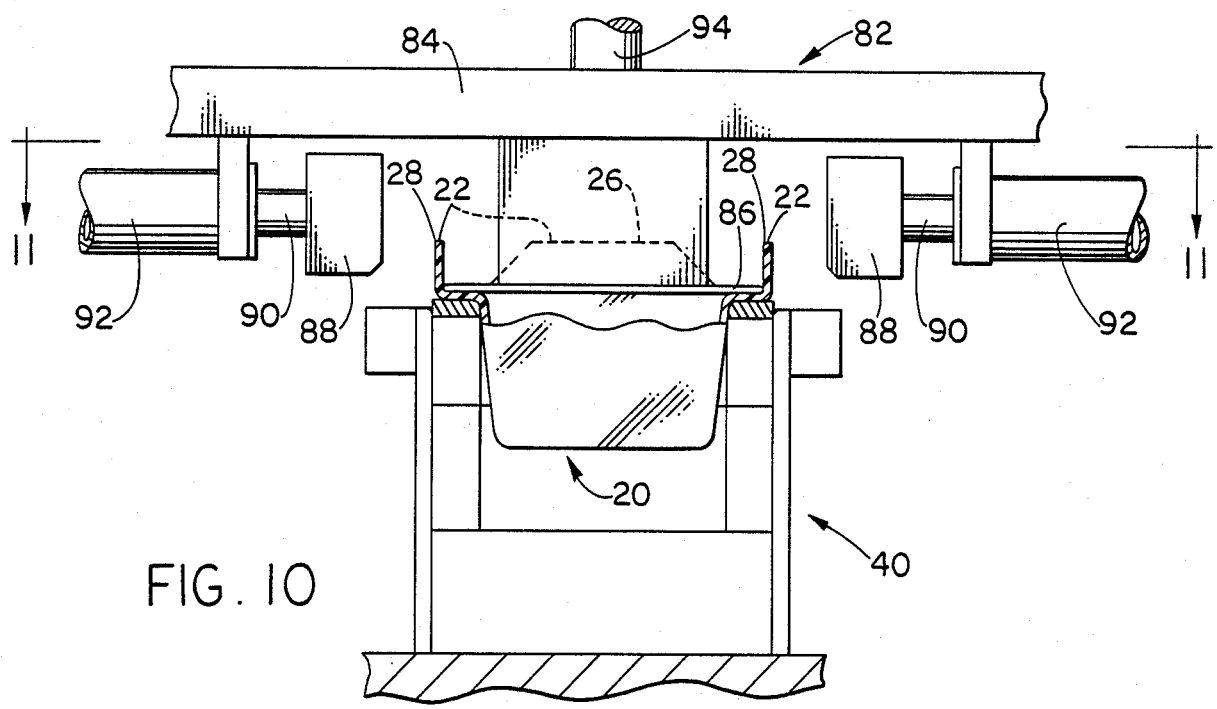
FIG. 10 is a side elevational view of the top end of the die of the present invention illustrating the folding plate in position after it has been lowered down on top of the flanges of the pre-formed blister.

When the pre-formed blister 20 arrives at the means for folding the edges of the sheet of material 82, the ends of the edges 22 of the pre-formed blister 20 are still in an upright position and the material along the fold lines 80 is still in a pliable condition. As seen in FIG. 10, the means for folding the edges of a sheet of material 82 includes a frame 84, folding plate 86, a plurality of horizontally movable bars 88 which are each attached to the frame 84 and move in relation to the frame 84 by separate pistons 90, which fit into individual sleeves 92, and a vertically movable folding assembly rod 94.

Figure 11:
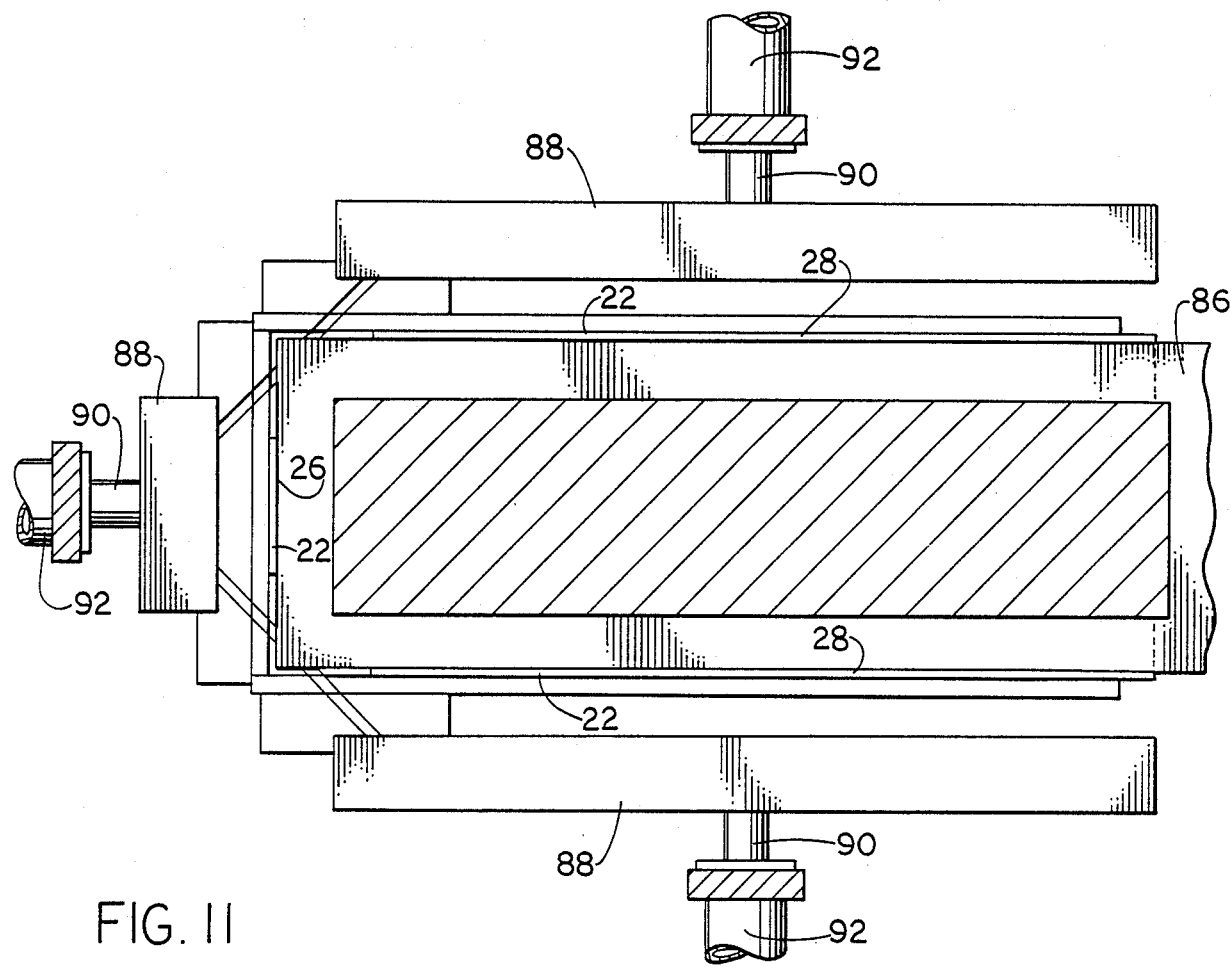
FIG. 11 is a sectional view taken along lines 11—11 of FIG. 10 showing the horizontally movable folding bars of the present invention in place next to the three edges of the pre-formed blister before they complete the folding operation.
Figure 12:
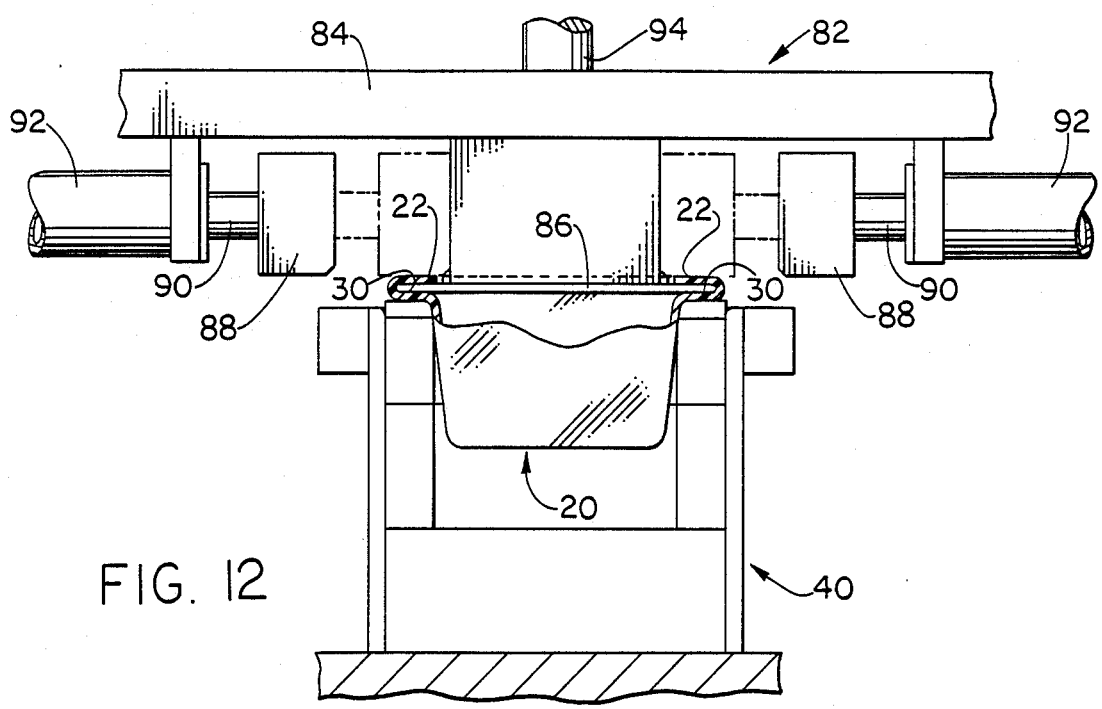
FIGS. 12 and 13 are side elevational views showing subsequent steps performed by the means for folding the edges of the sheet of material.

Initially, the folding assembly rod 94 is lowered so folding plate 86 is pressed down upon the unfolded portion of the sheet of material, shown as the flanges 30, of the pre-formed blister 20, in FIG. 10. At this stage, as seen in FIG. 11, the horizontally movable bars 88 are in position along the three edges, side edges 28, and bottom edge 26 of the pre-formed blister 20. As seen in FIG. 12, with the folding plate 86 still in position on top of the flanges 30, the horizontally movable bars 88 fold the upright edges 22 of the pre-formed blister 20 over the folding plate 86 inward until the edges 22 are 180° disposed from their original orientation. The pre-formed blister 20 remains in this position for a sufficient time to allow the material along the fold lines to cool so the edges 22 retain the shape leaving a space between the folded edges 22 and the unfolded flange 30.

Figure 13:
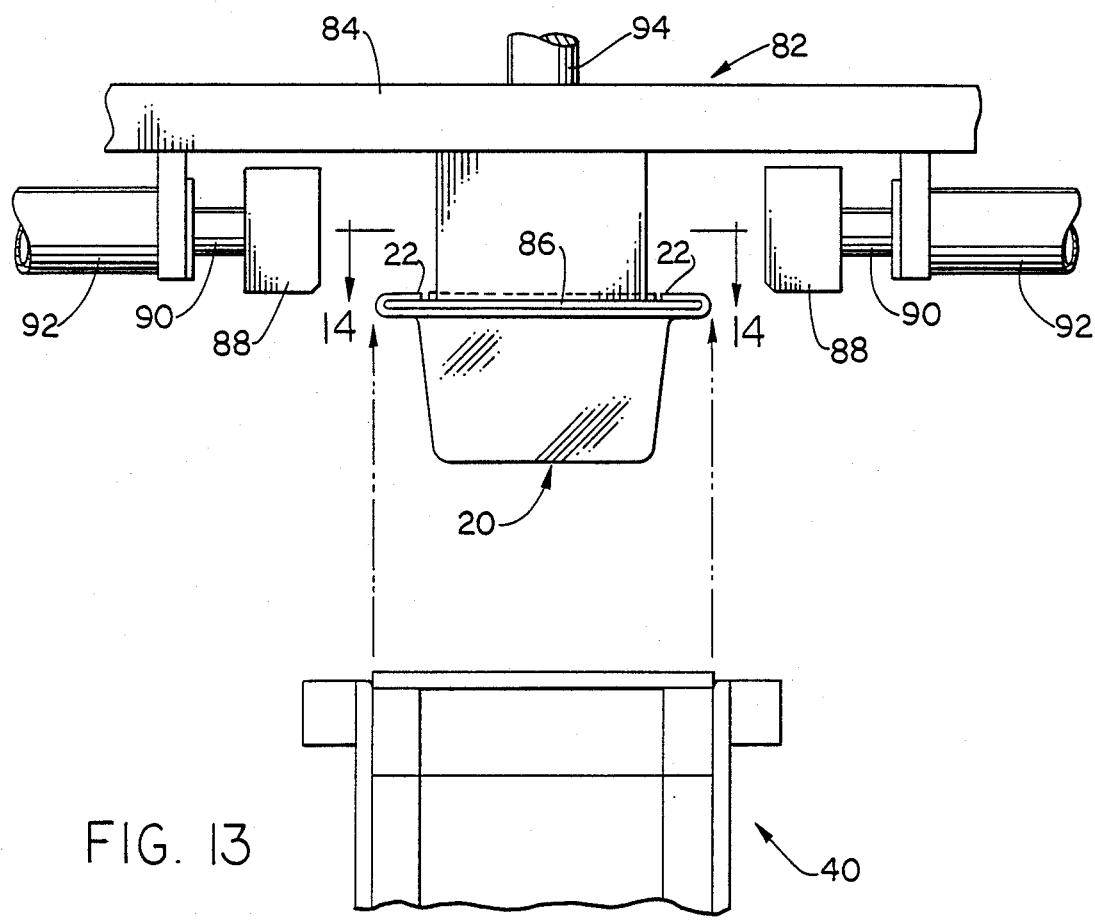

FIG. 13 illustrates that after the folding operation has been completed on the edges 22 of the pre-formed blister 20, the folding assembly rod 94 is raised, and the entire means for folding the edges of the sheet of material 82 is moved upward out of the die 40. As further seen in FIG. 13, the pre-formed blister 20 is still attached to the folding plate 86, and is also raised out of the die 40. The bottom edge 26 and side edges 28 of the pre-formed blister 20 are folded over the folding plate 86 in much the same manner as they will be folded over the backing of the blister package in its final assembled form, and will remain on the folding plate 86 until ejected.

FIGS. 14 and 15 depict a top view of the folding plate 86 taken in section along lines 14—14 of FIG. 13, and a side elevational view of FIG. 14 taken along lines 15—15, respectively to illustrate the manner in which the ejector means 96 operates to eject the folded pre-formed blister 20, off the folding plate 86.

As seen at the top end 98 of the folding plate 86 in FIG. 14, the ejector means 96 includes a collar 100 at the end of an ejector rod 102. As seen in FIG. 15, the collar 100 is a plate which is in the shape of a "C" on its side. The collar 100 has an opening 104 at the top which generally conforms to the shape of the edge of the folding plate 86. The collar 100 fits around the folding plate 86 in such a manner as it is able to slide along the folding plate 86. The ejector rod 102 is attached to the folding plate 86, and is perpendicular to the plane of the folding plate 86.

In operation, the ejector rod 102 is moved horizontally in a sharp, rapid manner so the collar 100 moves a short distance along the folding plate 86, from the top end 98 thereof to the bottom end 106. When the collar 100 moves in this fashion, the edges of the collar 100 around the opening 104 come in contact with the edges 22 of the folded pre-formed blister 20, to cause the folded pre-formed blister 20 to slide off the folding plate 86. The device has then completed a full cycle.

From the foregoing description it is seen that the present invention provides a simple, yet efficient method and means for folding the edges of a sheet of material, particularly the edges of a pre-formed plastic blister, such as those commonly used as a cover in the "blister" package form of packaging.

While a preferred embodiment of the invention has been described in detail, it will be obvious to those skilled in the art that various modifications and substitutions may be made to the preferred embodiment without departing from the spirit and scope of the invention as defined by the appended claims.

Having thus described the invention, what is claimed is:

1. Apparatus for folding the edges of a sheet of material, which comprises:
   a die having walls on the sides;
   a compressible layer which rests on top of the die, over which the sheet of material is placed;
   a means for applying heat and force to the sheet of material to make the sheet of material pliable at margins along the edges thereof and to compress the compressible layer to cause the edges of the sheet of material to be bent upward against the inside of the walls of the die; and,
   a means for folding the erected edges of the sheet of material on top of the unfolded portion of the sheet of material.

2. Apparatus as claimed in claim 1 wherein:
   the die has a shelf around the inside of its walls for supporting the compressible layer and the unfolded portion of the sheet of material while the edges of the sheet of material are being folded;

further comprising a template which rests upon the compressible layer and underneath the sheet of material to uniformly support the unfolded portion of the sheet of material when the means for applying heat and force to the sheet of material presses down on the sheet of material and causes the compressible layer to compress;

wherein the means for applying heat and force to the sheet of material is a member which has dimensions less than those between the inside of the walls of the die so that the force applied to the sheet of material will cause the sheet of material to be pressed downward and the edges of the sheet of material to be bent upward between the inside of the walls of the die and the sides of the member; and, wherein the means for folding the edges of the sheet of material comprises a folding plate and a plurality of horizontally movable bars.

3. Apparatus as claimed in claim 2, which is used for folding the edges of a rigid sheet of material which has a concave portion and flanges around the perimeter of the concave portion, wherein;

the die has a hollow section between its walls to receive the concave portion of the sheet of material;

the shelf around the inside of the walls of the die is approximately the same width as the portion of the flanges around the perimeter of the sheet of material which are inside of the walls of the die, to evenly support this portion of the flanges when the means for applying heat and force is applied to the sheet of material so that the unfolded portion of the flanges are not bent;

the compressible layer conforms to the shape of the shelf and also an opening to receive the concave portion of the sheet of material;

the template conforms to the shape of the shelf and has an opening to receive the concave portion of the sheet of material;

the member is a heating plate having outside dimensions which conform to, but are slightly less than the dimensions between the inside of the walls of the die;

the folding plate has outside dimensions which are less than those between the erected edges of the sheet of material so it can be placed down upon the unfolded flanges without disturbing the erected edges of the sheet of material and which remains in place while the plurality of horizontally movable bars fold the erected edges of the sheet of material over the top of the unfolded flanges so a space is formed between the edges of the sheet of material and the unfolded portion of the flanges after the edges of the sheet have been folded.

4. Apparatus as claimed in claim 3 further comprising a cutter which cuts off the corners of the sheet of material prior to the application of the means for applying heat and force to the sheet of material so that the edges of the sheet of material will not overlap at the corners when they have been folded.

5. Apparatus as claimed in claim 3 further comprising an ejector means, which comprises a collar having an opening which generally conforms to the shape of the edge of the folding plate, and which slides along the folding plate to push the folded sheet of material off the folding plate.

6. A method for folding the edges of a sheet of material comprising the steps of:

providing a die having walls on the sides and a compressible layer which rests on top of the die;

placing a sheet of material on top of the compressible layer so the edges of the sheet of material extend outside the walls of the die;

applying heat and force to the sheet of material from above to make the sheet of material pliable where the heat is applied and to compress the compressible layer to cause the edges of the sheet of material to be bent upward against inside of the walls of the die; and, folding the edges of the sheet of material which have been bent upward on top of the unfolded portion of the sheet of material.

* * * * *